United States Patent [19]

Krepler

[11] 4,144,092

[45] Mar. 13, 1979

[54] PROCESS FOR REGENERATING A NITRIC ACID-HYDROFLUORIC ACID PICKLING SOLUTION

[75] Inventor: Albert Krepler, Vienna, Austria

[73] Assignee: Ruthner Industrieanlagen-Aktiengesellschaft, Vienna, Austria

[21] Appl. No.: 867,096

[22] Filed: Jan. 5, 1978

[30] Foreign Application Priority Data

Mar. 10, 1975 [AT] Austria ............... 1826/75

Related U.S. Application Data

[63] Continuation-in-part of Ser. No. 665,227, Mar. 9, 1976, abandoned.

[51] Int. Cl.² ............................................. B08B 7/04
[52] U.S. Cl. ........................................ 134/12; 134/13; 203/48; 210/45; 210/56; 210/71; 423/DIG. 1
[58] Field of Search ............... 134/12, 13; 423/390 P, 423/484, DIG. 1, DIG. 2; 203/48; 210/45, 56, 71

[56] References Cited

U.S. PATENT DOCUMENTS

| | | |
|---|---|---|
| 2,017,773 | 10/1935 | Smith et al. ............... 134/13 UX |
| 2,993,757 | 7/1961 | Dasher et al. ............... 423/484 |
| 3,048,503 | 8/1962 | Foote et al. ............... 134/13 X |
| 3,840,646 | 10/1974 | Sugimoto et al. ............... 134/13 X |

*Primary Examiner*—Marc L. Caroff
*Attorney, Agent, or Firm*—Imirie, Smiley & Guay

[57] ABSTRACT

In pickling metal, such as iron, steel, special alloys, or the like, aqueous blends containing hydrofluoric acid and nitric acid are used as pickling solutions; resulting spent pickling solutions are evaporated under controlled conditions, such that the concentrate is supersaturated and contains a predetermined amount of iron; the concentrate is then partially cooled and transferred to a crystallization zone where, under controlled conditions, a crystalline precepitate is formed by cooling the concentrate in two phases; the resulting precipitate is then separated from its mother liquor, and the latter is recycled for use in pickling metals of the aforedescribed type.

14 Claims, 8 Drawing Figures

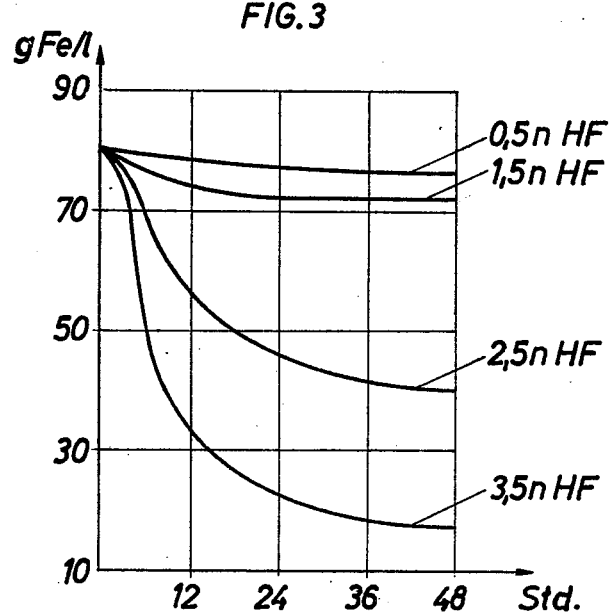
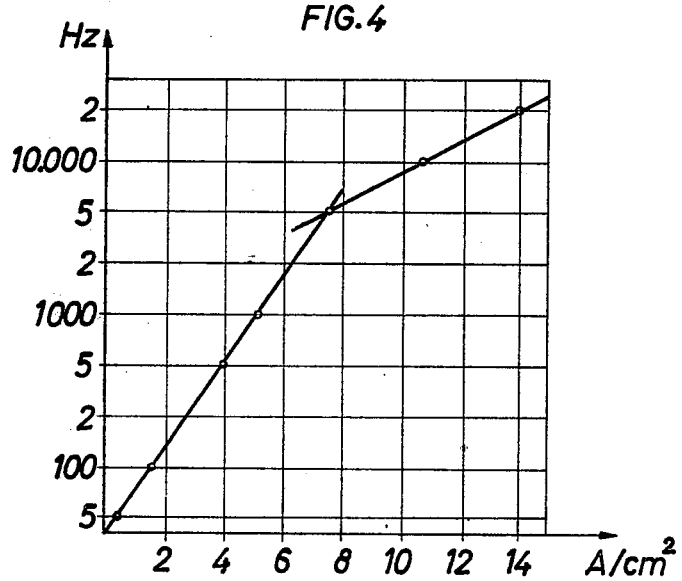

PROCESS FOR REGENERATING A NITRIC ACID-HYDROFLUORIC ACID PICKLING SOLUTION

The present application is a continuation-in-part of application Ser. No. 665,227, filed Mar. 9, 1976, now abandoned, by the present applicant and bearing the same title.

BACKGROUND

For economy and ecological reasons, numerous efforts have been made heretofore to recover, from spent mixed acid (i.e. HF/HNO$_3$) solutions, valuable chemicals which can be used for pickling purposes, and to cope with serious ecologically undesirable waste sewage problems. Inherently, recycling of hydrofluoric acid and nitric acid would provide real economy if recovery thereof and recycling could be achieved economically.

Unfortunately, processes proposed and/or adopted in recent years are expensive, cumbersome, involved, or all of these.

Typically, one process which has been recommended would use, e.g., sodium fluoride to precipitate the double salt Na$_2$FeF$_5$, separation of the latter and treating it with caustic soda in order to separate ferric hydroxide and recover recyclable sodium fluoride. The process is very highly expensive because of the presence of other metal fluorides and the requirement that a partial stream of any recycled solution be treated with caustic soda.

In another proposed process a strongly basic ion exchange resin is contacted by the spent pickling solution and the ion exchange resin washed with water. As with a chromatographic column, the effluent exhibits two partly overlapping concentration peaks, the first of which is due to the predominating quantity of salts and the second to the presence of free acids. An optimal separation of fractions allegedly enables a recovery of about 60% of free nitric acid present. The acid/salt fraction must be treated with neutralizing agents. This method likewise does not really solve the problem because the recovery rate is unsatisfactory.

In a third suggested method, the nitric and hydrofluoric acid residues combined with metal ions are first released by the addition of sulfuric acid in a corresponding quantity, and free acids plus dissolved molybdenum are extracted with a solution of tributyl phosphate in kerosene. The acids are eluted with water from the organic solvent phase and the resulting aqueous solution is treated with activated carbon, after which it is returned to the cycle as regenerated solution. Before the organic phase can again take up acids, molybdenum fluoride must be removed therefrom by treatment with a sodium hydroxide solution. The resulting basic solution, together with an extraction residue which contains a major part of the heavy metals, is first neutralized with lime and then with a sodium hydroxide solution. It is apparent from this short description that detailed technological problems are involved, as well as considerable expenditures for equipment, control mechanisms, and chemicals.

As is well known, spent pickling solutions contain various metal ions. In addition to ferric ion, the quantity of which predominates, the solutions contain mainly chromium, nickel, and molybdenum; also present may be copper, vanadium, tungsten, cobalt, manganese, and many others, including titanium. Titanium, for example, can be treated, say, in the form of sheet titanium, with the same solutions used on high-grade steels. For reasons of pickling technology, resulting spent solutions must be discarded when they contain only 40–50 g/l ferric ion, although they may then still contain unused nitric acid in high concentrations, e.g., 150 g/l. This requirement creates great problems involving neutralization and waste sewage disposal. Additionally, of course, operating costs, owing to poor utilization of chemicals, inter alia, are very substantial.

As will be evident from the description, infra, of the present invention, a surprisingly straightforward and simple, and equally surprisingly effective, process has been discovered. In other words, major problems in the nature of those inherent in the prior art are obviated. Furthermore, the novel process which will be described hereinafter differs from this prior art in that extraneous acid, extraneous salt, extraneous solvent, or the like, are not added to spent pickling solutions; further, the solutions are not contacted with anion exchange resins, which resins are never perfectly resistant to nitric acid solutions.

INVENTION

The present invention relates to a process and apparatus for recovering and recycling nitric acid and hydrofluoric acid from spent aqueous solutions resulting from surface treatment (pickling) of iron, high-grade steel, special alloys, and the like. More particularly, the method of the recovery which may be continuous or batch, involves supersaturating, under controlled conditions, spent pickling solutions by distillation; transferring the concentrate to a crystallization zone, and, again under carefully controlled conditions, crystallizing to form a precipitate of metal salts, e.g., FeF$_3$, CrF$_3$; separating the metal salt precipitate from its mother liquor; and recycling the latter to a pickling zone.

Even more particularly, the process of the present invention comprises transferring from a pickling zone spent aqueous pickling solution containing mixed acids having a temperature in the range of about 30° C. to about 80° C., generally about 40°–60° C., to an evaporation zone; heating said spent solution to boiling (generally about 105° C.), and thus distilling said spent solution in the evaporation zone, the boiling temperature rising upon vaporization (generally to about 107.5° C.); removing the resulting supersaturated concentrate from the evaporation zone; cooling said concentrate to a temperature in the range of about 50° C. to about 100° C., preferably about 70° C. to about 78° C.; introducing same into a crystallization zone, whereupon further reduction of temperature to about 30° C.–70° C., preferably about 40° C. to about 60° C., is effected; stirring the concentrate in the crystallization zone at said temperature for a period of about 3 to 15 hours, preferably about 4 – 12 hours, to effect the initial crystallization; then, after said initial and rapid crystallization during which the major and first-phase crystallization takes place, decreasing the temperature of the concentrate to a temperature in the range of about 15° to about 30° C., preferably about 18° C. to about 25° C., to effect an increased second-phase crystallization, while likewise stirring, the second phase time period being about the same length as that of the first phase; separating the resulting cake precipitate from its mother liquor, such as by filtration; and recycling said mother liquor to the pickling (surface treatment) zone.

It has been found that crystallization takes place more rapidly in the first phase, i.e., at a temperature in the range of about 30° C. to about 70° C. In fact, during first-phase crystallization as suggested above, the major part of the crystallization takes place. It has also been discovered that it is highly advantageous to carry out the second-phase crystallization in the above-noted lower temperature range to effect more complete crystallization, i.e., an increase in crystals due to decreased solubility of crystallizable components (e.g. iron) at these lower temperatures.

Supersaturation of the distillation residue (concentrate) created in the vaporization zone is critical. It is important to note here that conventional evaporation/crystallization processes useful in other fields of chemical technology are unsatisfactory to effect recovery of valuable chemicals from spent pickling solutions. In other words, simple evaporation close to saturation, followed by cooling with crystallization and supersaturation, is not effective.

As the spent pickling solution is evaporated, water which is only slightly contaminated is distilled off first. This water need not be returned into the cycle. Only when a certain increase in concentration has been effected does the distillate contain hydrofluoric and nitric acids in such a concentration that return of the distillate to the solution cycle constitutes an advantage, which advantage should be utilized.

The solutions to be processed vary somewhat in concentration. This is mainly due to the different contents of the various metals in, for example, high-grade steels, special alloys, and semi-finished titanium products, and also to the concentrations to which the acids have been adjusted. It is sometimes endeavored to produce special technological effects by an addition of some sulfuric and hydrochloric acids. The process may also be applied to such solutions if nitric acid and hydrofluoric acid and dissolved iron are present in substantial quantities.

It has been found desirable in most cases to maintain the dissolved iron content in the distillation residue between 60 and 150 g/l, preferably between 80 and 120 g/l. Crystallization is sufficiently fast under those circumstances. It has been found that crystallization takes place more rapidly the higher the iron concentration in the concentrate.

The temperature of crystallization may be controlled by internal or external heating and cooling means, if ambient conditions are not helpful. According to one embodiment, wherein cooling of the concentrate, as indicated supra, is effected to about 50° C.–100° C., before it enters the crystallization zone, temperature control in the crystallization zone can be maintained by providing one or more additional successive crystallization zones. For example, using two crystallization zones, the first zone is fed and kept filled continuously and temperature maintained during first-phase crystallization by incoming hotter concentrate. Overflow from the first crystallization zone is directed to the second crystallization zone, thus effecting a drop in temperature but maintaining a relatively constant second phase temperature by virtue of the likewise incoming relatively hotter concentrate.

More than two crystallization zones are preferred to avoid the situation where residence time in the first crystallization zone is inadequate with respect to a portion of the concentrate which migrates too soon to the overflow conduit and thus is cooled prematurely. This would not permit sufficient crystallization to take place as to it.

If four or six successive crystallization zones are established, flow and overflow could be so controlled as to provide an average temperature in the first two or three zones, respectively, of about 30° C. to 70° C. (first phase) and an average temperature in the last two or three zones, respectively, of about 15° C.–30° C. (second phase). In this way residence times in both phases and for the entire concentrate can be substantially uniform.

As is evident, in the continuous system provision should be made to periodically remove crystals from the mother liquor.

Because iron fluoride is the main constituent of the crystalline precipitate, the concentration of iron in the concentrated solution leaving the evaporator can be an important variable for the purpose of controlling the extent of evaporation. It has been found, however, that other variables which are more or less closely related to the iron concentration, such as the fluorid ion concentration or density, and which can be more easily determined, may alternatively be used as a control indicator.

The surprising result reproduced by the process of the present invention resides in that, contrary to previous experience, solutions can be supersaturated in continuous operation in an evaporator under certain circumstances, and the concentration of the concentrate can be so controlled that readily separable fluorides are precipitated therefrom. This technology requires at least initially a control of the residence time of the solution in the evaporator. In batch operation, the evaporation is simply continued for a certain maximum time. In continuous evaporation, a check can be made by the addition of a non-reactive substance to the solution at the inlet of the evaporator. The residence time spectrum can then easily be established from the time function diagram of the concentrations of said substance in the evaporator effluent. Under conditions equal in other respects, the residence time may be varied, e.g., in reciprocal dependence on the solution rate. It has been found necessary to limit the residence time of the solution in the evaporator to less than 60 minutes, preferably less than 15 minutes. After this time all the non reactive substance added must have left the evaporator. It will be understood that in continuous evaporation it is essential that the residence time spectrum of the solution in the evaporator be as sharp as possible. It has been found particularly desirable to conduct the solution through the evaporator in one or more flow channels and to heat the solution preferably by direct electric resistance heating with alternating current.

It is not necessary to use very high frequencies for avoiding an electrolytic dissociation of the solution. It will normally be sufficient to maintain the current density at the solution-electrode interface below $3.5\sqrt{f}$–$5.5\sqrt{f}$ A/cm$^2$, where f is the frequency of the alternating current in sec.$^{-1}$. At a supply system frequency of 50 Hz, the maximum current density is then about 0.45 A/cm$^2$.

It has been found that the evaporation rate can easily be controlled by an automatic control of the overflow level of the concentrated solution because this results in a variation of the cross-section of the solution and, if the voltage and the solution resistance are constant, in a variation of the electric current and electric power.

If an increase in density results in a lower overflow level, the density may be automatically controlled in a simple manner. In case of an excessively high power, the density increases and with it decreases the current-carrying cross-section of the solution flowing through the evaporator, so that the evaporation rate will also decrease. As a result, the density is reduced and the automatic control action takes place in the opposite sense. It will be understood that, alternatively, the evaporation rate may be controlled by a transformer, thyristor, or the like.

A complete explanation of the solubility relations in the present solution system would be an enormously difficult task, not only because such a large number of different ions are involved but also becuase iron fluoride can occur in the solid phase in a large number of different forms, and a plurality of crystallites tend to remain in existence simultaneously although only one crystal form is in thermodynamic equilibrium.

Nevertheless, a detailed consideration of these solutions reveals certain regular phenomena, which involve a kinetic activity that is significant in practice. In this connection it is mainly significant that a satisfactory yield of crystals decisively depends on the presence of fluoride ions in an amount which is sufficient for combining with the metal ions also present. For this reason, another rule which is desirably followed calls for a continuous or discontinuous addition of hydrofluoric acid to the circulating solution at any desired point in order to maintain the fluoride ion normality of the concentrate always above the sum of the metal ion normalities before crystallization begins.

It has now been found that hydrofluoric acid is predominantly distilled off even in preference to a large surplus of nitric acid. For this reason it is desirable in most cases to add the make-up hydrofluoric acid to the solution cycle after the distillation and before crystallization begins.

Different considerations are applicable to nitric acid. It is known that almost all nitrates are very highly soluble. In the present system, in which nitrates are associated with hydrofluoric acid, the nitrate concentration has virtually no influence on the precipitation of crystals. Because some mother liquor is separated with the precipitation of crystals, the resulting loss of nitric acid is proportional to the nitric acid concentration in the concentrated solution which is available before the crystallization begins. For this reason it is not advisable, as in the case of hydrofluoric acid, to add nitric acid at this stage. According to a preferred feature of the invention, the make-up nitric acid is added to the circulating solution after the crystals have been separated. To this end, the acid may be added to the mother liquor or fed directly into the metal-treating bath.

The economy of the process depends also on the time in which crystallization is allowed to take place in the concentrated solution. It has been found that a time interval of 6 to 30 hours, preferably 8 to 24 hours, is preferably allowed to elapse between the distillation and the separation of crystals.

Apparatus which can be used to carry out the process which has been described above comprises one or more continuous or batch evaporators, condensers, crystallizers, crystal separators, fittings and pipelines for connection to the metal-treating (pickling) plant. This equipment consists of or is lined with materials which are resistant to nitric and hydrofluoric acids. Examples of such materials are polyfluorohydrocarbons, sintered corundum and structural graphite. A desirable evaporator consists of one or more flow channels formed by substantially horizontally extending, straight or curved pipes, which are circular or profiled in cross-section and which may have an upwardly flaring, trapezoidal cross-section for receiving foam, vapor off-takes for the evaporated liquid, inlets and outlets for the solution flowing through, and a plurality of electrodes, which are spaced apart along the flow channels and immersed in said solution and consist, e.g., of graphite and are provided with terminals and serve for a direct resistance heating of the spent pickling solution with alternating current.

Because the electrodes assume a high temperature in operation, any portion of an electrode which protrudes from said solution will promote formation of undesirable crusts and may even cause undesirable introduction of seed crystals. For this reason, a desirable embodiment comprises electrodes which are introduced from the bottom or from the sides of the evaporator and are entirely submerged in the solution.

As has been mentioned, it will often be desirable from the aspect of process technology to divide the distillate into a plurality of fractions and to use a first of these fractions, e.g., as rinsing water, whereas a second and any subsequent fractions are returned to the circulating solution. Such division involves no difficulties when evaporation is carried out batch-wise. In the case of continuous evaporation, the space over the aforesaid flow channels of the evaporator must be divided for this purpose into a plurality of compartments, such as consecutive compartments. A continuous evaporator suitable for this purpose has one or more transverse internal partitions above the body of flowing solution which divide the gas space thereover, separate vapor off-takes being provided for the respective compartments. It will be understood that with separate condensation of the resulting vapor fractions the aforementioned wash water and recyclable pickling solution make-up can be achieved.

Referring now to the nature of a desirable crystallizer, it must be remembered that the crystal habits sometimes tend to undesirably adhere to the walls of the crystallizer. For this reason it is preferred to use a simple crystallizer. However, since such a crystallizer has, by definition, walls which are closely spaced apart, the immersed surfaces thereof are best wiped off, continuously or periodically, to prevent build-up of crystals thereon.

Typically, the crystallizer consists of an upright cylindrical vessel having an inlet and an outlet, a driven shaft which extends along the axis of rotation of the vessel and is profiled by being provided with radial ribs extending along said axis. One or more circular columns (roll-like upright members) are provided, which stand on the bottom of the vessel and are positioned between the driven shaft and the inner wall of the vessel, which upright members are rotatable and provided with ribs, arranged in a star-shaped configuration and extending along the axis of each of said members. These roll-like members are so positioned as to contact the side wall of the vessel and mesh with the ribs of the driven shaft so that each roll-like member rotates on its own axis and revolves in the opposite sense in the annular space between the drive shaft and the side wall of the vessel, whereby all immersed surfaces are wiped so as to wipe off adhered crystals or to maintain the thickness of adhered crystals below 10 mm, preferably 5 mm.

Practical experiments have shown that the drive shaft of the crystallizer is preferably profiled by the provision of 1 to 4 ribs and each of the members rising from the bottom is preferably profiled by the provision of 5 to 8 ribs.

Further details of the process and apparatus will now be explained more fully with reference to the drawings, in which FIGS. 1 to 3 are diagrams which illustrate the crystallization rate.

FIG. 4 illustrates the relation between the highest permissible current density at the electrodes and the frequency of the alternating current.

Figure 6:
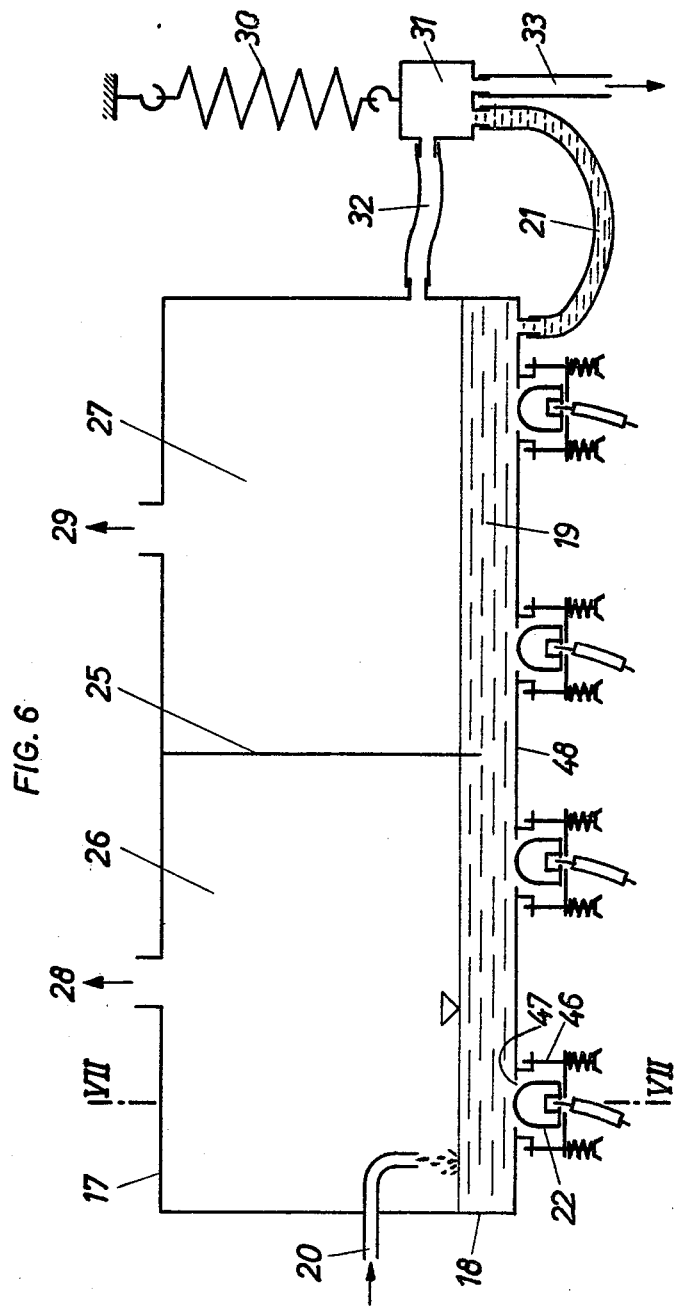
FIGS. 6 to 8 are sketches which represent illustrative embodiments of the apparatus.
Figure 7:
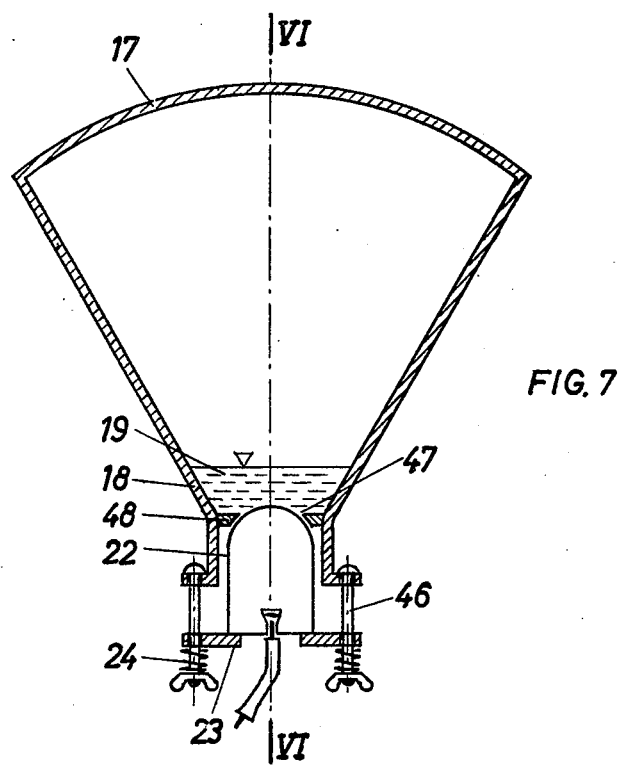
Figure 8:
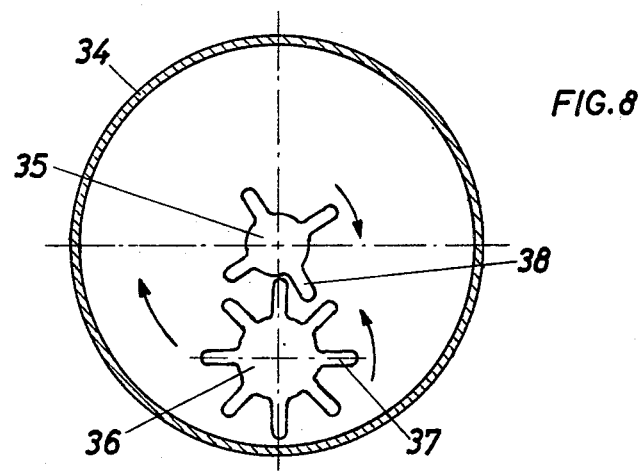

Specifically,

FIGS. 6 and 7 are diagrammatic views showing, by way of example, different sectional views of a trough evaporator according to the invention, which evaporator operates with a sharply-defined, short-time residence time spectrum for the solution to be evaporated, FIG. 6 being a sectional view taken along line VI—VI in FIG. 7 and FIG. 7 a sectional view taken along line VII—VII in FIG. 6, and FIG. 8 is a horizontal sectional view illustrating the principal of a crystallizer according to the invention.

Figure 1:
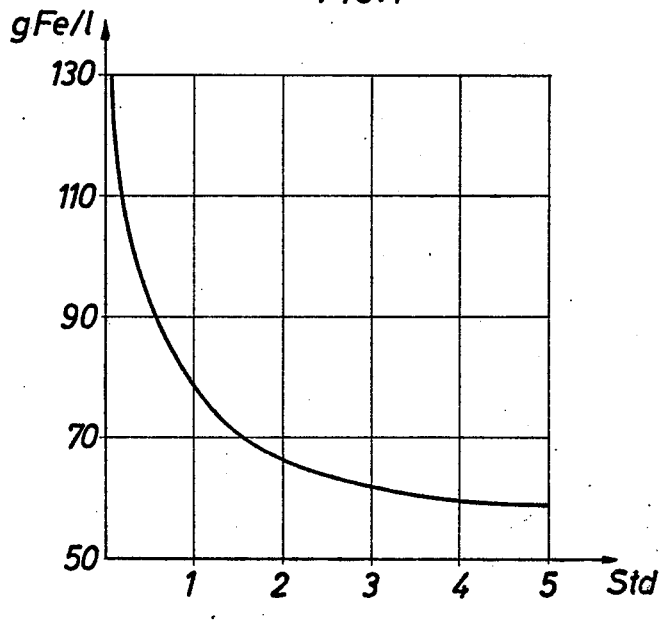

FIG. 1 shows the approximate relation between the iron concentration (g Fe/l) resulting from evaporation and the time lapse (hrs) between the end of evaporation and start of crystallization.

It is apparent that the evaporation can be carried out to effect a larger or smaller increase in concentration, depending on the residence time of the solution in the evaporator and on the sharpness or width of the residence time spectrum. The use of conventional evaporators hardly enables an evaporation to a concentration of more than 80 g/l Fe or, at most, 90 g/l Fe in the concentrated solution. High-intensity continuous trough evaporators may be used for an evaporation to a concentration of, e.g., 110 g/l Fe if the solution flowing through is subjected to the evaporation process for only a few minutes. This indicates that the use of a properly designed evaporator is essential because only a high iron concentration enables a fast crystallization with a high yield.

Figure 2:
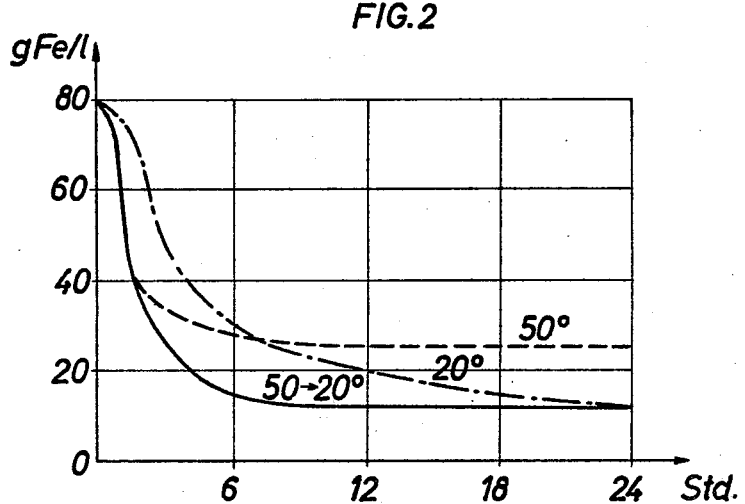

The influence of temperature and the change of temperature on the $Fe^{+++}$ concentration in the solution during the crystallization is apparent from FIG. 2. A solution containing 80 g $Fe^{+++}$, 14 g $Cr^{+++}$, 6 g $Ni^{+++}$, about 280 g $NO_3^-$ and 150 g $F^-$ was divided into three portions, each of which was treated while being stirred. As is indicated by a dash-dot line, the first portion was initially cooled to 20° C. and then left at this temperature. The dotted line indicates that the second portion was cooled to 50° C. and held at this temperature. A solid line indicates that the third portion was initially cooled to 50° C. and then permitted to cool slowly to room temperature.

As this was only a basic test, the temperature-time function has not been recorded. In any case the tests show clearly the surprising behavior of supersaturated solutions of this kind when subjected to retarded crystallization. A fast cooling is undesirable from the aspect of crystallization technology. On the other hand, a slow cooling results initially in a higher crystallization rate, which is due to the higher temperature, and permits subsequently of a utilization of the lower solubility at a lower temperature.

For this reason, solutions actually available in practice can be used in the laboratory for defining an optimal temperature-time function, which can be program-controlled. It is believed, however, that a slow cooling of, e.g., 100 liters of solution during several hours with exposure to the air, is sufficiently close to the optimum so that the considerable expenditure involved in a time program-controlled cooling is not required. A similar time function is exhibited, e.g., by the concentration of dissolved chromium.

FIG. 3 shows the decrease of the $Fe^{+++}$ content of the same solution during the slow cooling to room temperature in the presence of different contents of free hydrofluoric acid. In the present medium, which has a high nitric acid content, the content of free hydrofluoric acid corresponds to the normality of the fluoride ion concentration less the sum of the metal ion normalities. It is apparent that the crystallization is strongly accelerated by a surplus of 60 to 70 g/l hydrofluoric acid. The addition of more hydrofluoric acid does not result in a substantial further improvement and may sometimes even produce undesirable results, possibly by the formation of complexes.

The direct electric heating of electrolyte-containing solution may result in an electrolytic dissociation of the solution. For this reason, the upper limits of the current densities at platinum electrodes have been measured at different a.c. frequencies. These upper limits of the current densities are the highest current densities which can be employed for a prolonged time without an evolution of gas. It has been found that these current density limits, like the actual over-voltages, are related to the a.c. frequency by exponential functions, which are shown in FIG. 4 and which differ for the ranges above and below 5000 Hz, respectively.

Only the lower part of the curve is of practical significance and is fairly exactly in accordance with the above-mentioned formula and indicates a maximum permissible current density of 0.45 $A/cm^2$ at the electrodes at a supply system frequency of 50 Hz. A slightly higher frequency may be used with the usual graphite electrodes, depending on the specific material. It is believed that in this case a certain influence is also exerted by the effective surface area, which exeeds the geometric surface area. In any case, an operation in the safe range is possible with the above values determined for platinum electrodes.

The size of the electrode does not normally constitute a limiting design value, and the electrode material will not be significant for the costs. For this reason, the low current density which is permissible at a supply system frequency of 50 Hz will usually be considered sufficient because the costs of a generator for higher frequencies need not be incurred in that case.

Figure 5:
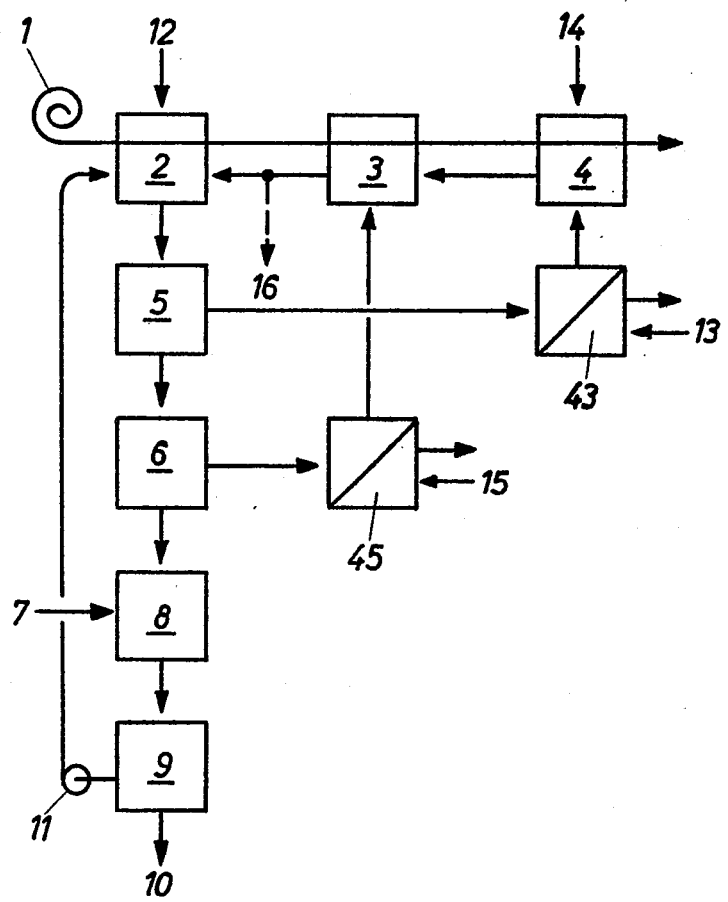
FIG. 5 is a flow sheet of block diagrams illustrating a preferred embodiment of the process of the present invention.

In the process illustrated in the flow sheet of block diagrams of FIG. 5, a high-grade steel strip 1 is pickled as it is pulled through a nitric-hydrofluoric acid bath 2 and is then rinsed twice in two rinsing stages 3 and 4. The used solution is evaporated to a higher concentration in two stages 5 and 6. Make up hydrofluoric acid 7 in the required amount is added to the concentrated solution as it is circulated. The concentrated solution is then allowed to cool slowly in a crystallizer 8. When a cake 10 consisting of moist $FeF_3$, $CrF_3$ etc. has been separated, the mother liquor is recycled to the pickling vessel 2 by a pump 11. Nitric acid 12 required to make up the circulating solution is added directly to the pickling bath 2.

The distillate withdrawn from the pre-evaporator 5 is indirectly cooled with cooling water 13 in a heat exchanger 43. The resulting condensate is virtually pure water, which can be used in the second rinsing stage 4, to which additional rinsing water 14 must be added in most cases. The rinsing water used in this stage is then used in the first rinsing stage 3. The only slightly acidic distillate from the second evaporator 6 may also be used in the stage 3 when this distillate has been condensed by being indirectly cooled with water 15 in a heat exchange 45. Alternatively, it may be preferred to feed said distillate directly into the pickling bath 2.

The effluent from the first rinsing stage 3 serves to fill up the volume of the pickling bath 2. Any surplus effluent 16 not required for this purpose must be subjected to sewage treatment.

The evaporator 17 shown in FIGS. 6 and 7 has approximately the shape of a prism which tapers to form a trough 18 and in which the solution 19 received at one end 20 is evaporated as it flows through said trough. The effluent is conducted through a flexible conduit 21. Four carbon electrodes 22 are engaged by annular discs 23, which are guided by pins 46 and are biased by coil springs 24 tending to hold the electrodes in sealed engagement with the edges of circular apertures 47 in the bottom 48 of the evaporator. The phase conductors R, S, T, R etc. of the three-phase a.c. supply system used by way of example are connected to successive ones of these electrodes. The electrodes 22 are contacted by the solution only at the slightly convex end faces of the carbon electrodes. A transverse partition 25 defines two separate vapor compartments 26, 27, from which two respective distillates 28, 29 can be separately withdrawn.

It is essential to provide wide off-take conduits and to ensure an equalization of pressure so that the surface of the solution being distilled is not subjected to differential pressure by the vapors. An overflow vessel 31 is suspended from a spring 30 and provided with a flexible pressure-equalizing conduit 32 and a drain conduit 33. This overflow vessel rises and falls in dependence on the density or concentration of the concentrated solution. As the concentration and density of the solution increase, the overflow vessel falls and with it the level of the solution flowing in the evaporator so that the cross-section of the solution 19 is decreased. When the voltage is constant and the resistivity of the solution changes only slightly, the resistance and with it the electric power and the rate at which liquid is evaporated is automatically controlled in such a manner that the density of the outflowing concentrated solution is maintained constant and the salt concentration of said solution is approximately constant. This simple automatic control system is merely illustrative, since many others can be employed.

The crystallizer shown in FIG. 8 comprises a barrel-shaped vessel 34 which contains a central vertical driven shaft 35, which, in turn, is provided with four wing-like radial ribs 38. The vessel is also provided with a vertical circular column 36 which stands on the bottom of the vessel, is freely rotatable, and provided with eight radial ribs 37 creating a star-shaped configuration. The column 36 is rotated about its axis by drive shaft 35 which likewise rotates about its own axis and is in rib-meshing (gear-like) relationship with said column. A plurality of columns 36 may be provided. The number of ribs 38 on drive shaft 35 and the number of ribs 37 on column 36 is optional. In a preferred arrangement, shaft 35 is provided with one to four ribs and column 36 is provided with five to eight ribs. Since the ribs, which are in loose mesh relationship, contact the inner bottom and the inner side wall of the vessel, removal of adhering crystal deposits therefrom or prevention of build-up to a substantial thickness is assured. The detached crystals gravitate to the bottom and can be discharged therefrom continuously or intermittently.

It is apparent from the above description that for the first time simple and economical steps are involved with maximum recovery of valuable chemicals. For example, the process of the present invention does not involve the formation of a heavy metal salt solution, which must be reprocessed, or of a hydroxide mud, which can be filtered only with difficulty, but involves the formation of a compact cake of precipitated fluorides, which in that form can be sent directly to a processor or may be processed with simple equipment in the system from which the cake was derived.

Typical of the simplicity and economy, also, are the fact that, as hereinabove suggested: at least the first distillation cut can be used to rinse the metal stock; used rinsing water can be added to the nitric acid treating solution; moist crystals which have been separated by e.g., filtration can be extracted with a small amount of water or used rinsing water, and nickel and, preferably, chromium and molybdenum as well, can be recovered from the resulting solution by known and facile methods, such as by selective precipitation, ion exchange or organic solvent extraction.

The selective precipitation and separation of nickel hydroxide and its processing for use in the production of high-grade steel is particularly recommended because nickel is very expensive. It will be understood that the crystals can be rendered substantially insoluble by being mixed with lime, whereby even hydrofluoric acid is transformed into insoluble calcium fluoride, and the insoluble material can then be dumped.

The crystals which have been extracted with water are sufficiently free from nitric acid and may be transformed into metal sulfates and hydrogen fluoride gas by a treatment with sulfuric acid at elevated temperatures. The hydrogen fluoride gas can be returned to the circulating solution. In most cases, however, it will be more desirable to adopt a modified procedure in which the crystals are heated to 200° to 600° C., preferably 300° to 400° C., whereby the presence of water in the form of moisture and water of crystallization cause the fluorides to be hydrolytically decomposed into solid metal oxides and gaseous hydrogen fluoride. The hydrogen fluoride is absorbed in water or in an aqueous solution - in many cases it is sufficient to use the water which is condensed by the indirect cooling from distilled-off vapors - and the thus absorbed hydrogen fluoride can be returned to the circulating solution.

Alternatively, the crystals formed may be prohydrolyzed, in the presence of aqueous vapour, in a furnace heated to 500° C. Iron fluoride is decomposed into iron oxide and hydrofluoric acid.

Other similar economies and efficiencies are inherent and will be obvious to the person skilled in the art.

EXAMPLES

The present invention will best be understood from the following examples which are not meant to unduly limit the scope of the invention but which are intended to be illustrative thereof:

EXAMPLE I

During the pickling of 10 tons of high-grade steel strip, 10 kg Fe, 2 Cr, and 1 kg Ni are dissolved in 397 kg of an aqueous solution of 3.9 kg Fe, 1.1 Kg Cr, and 6.7 kg Ni in 66.2 kg $HNO_3$ and 24.8 kg HF. This is accompanied by a decomposition or evaporation of 20 kg $HNO_3$ and by a removal of 0.2 kg HF and 60 kg $H_2O$ with the vapors sucked from the bath. The used rinsing water contains 0.9 kg Fe, 0.2 kg Cr, and 0.5 kg Ni dissolved in 3 kg $HNO_3$, 1.6 kg HF and 18 kg water. As a result, 345.6 kg of solution are subjected to distillation; this solution contains 13 kg Fe, 2.9 kg Cr and 7.2 kg Ni dissolved in 43.2 kg $HNO_3$ and 23 kg HF. 1.4 kg $HNO_3$, 2.2 kg HF and 142 kg water are distilled off. When the crystallization has been terminated, eight hours after the evaporation, 43.2 kg of a filter cake are separated, which contains 9.1 kg Fe, 1.8 kg Cr, and 0.5 kg Ni, which are mainly combined with 3 kg $HNO_3$ and 11.4 kg HF. The distillate is added to the filtrate, also a solution of 26 kg $HNO_3$ and 13.2 HF (calculated as 100% acid) in 55 kg water, so that a regenerate is obtained which amounts to 396.6 kg and consists of 3.9 kg Fe, 1.1 kg Cr and 6.7 kg Ni dissolved in 66.2 kg $HNO_3$ and 24.8 kg HF, balance water. Because the nickel fluoride is more soluble, it becomes enriched in the circulating solution until an equilibrium has been attained, as in this example. This solution has nevertheless an excellent pickling activity. All quantities stated in kilograms relate to one hour of operation. The system is in dynamic equilibrium. The acid quantities relate to sums, i.e., nitric acid and nitrates are referred to as "nitric acid"; the same applies the hydrofluoric acid.

EXAMPLE II

Into an evaporator having a heating capacity of 135 kWh/hr is fed a spent pickling solution at the rate of 78 gals/hr, i.e., 780 lbs/hr, and having the following profile:

| wt % |     | lbs/hr |
|------|-----|--------|
| 3.4  | Fe  | 26.5   |
| 1.1  | Cr  | 8.6    |
| 1.6  | Ni  | 12.5   |
| 12.0 | $NO_3$ | 93.6 |
| 6.0  | F'  | 46.8   |
| 75.9 | $H_2O$ | 592.0 |

The spent pickling solution from the pickling plant has a temperature of about 50° C. In the evaporator it is rapidly heated to boiling, i.e., 105° C., and, as concentration increases, the temperature rises to about 107.5° C.

The concentrate emerges from the evaporator at a rate of 34.8 gals/hr (407 lbs/hr) and has the following profile:

| wt % |     | lbs./hr |
|------|-----|---------|
| 6.5  | Fe  | 26.5    |
| 2.1  | Cr  | 8.6     |
| 3.1  | Ni  | 12.5    |
| 22.1 | $NO_3$ | 89.9 |
| 10.1 | F'  | 41.2    |
| 56.1 | $H_2O$ | 228.3 |

The vapors, on the other hand, are recovered as distillate by continuous condensation in a heat exchange (condenser) using cool water.

The vapors emitted from the vaporizer are introduced into a condenser (using 30° F. $H_2O$) and collected as distillate at a rate of 44.7 gals/hr (373 lbs/hr). The distillate has the following profile:

| wt % |     | lbs/hr |
|------|-----|--------|
| 1    | $NO_3$ | 3.7  |
| 1.5  | F'  | 5.6    |
| 97.5 | $H_2O$ | 363.7 |

As shown in FIG. 5 of the drawing and discussed heretofore, the condensate is recycled to the pickling zone.

The supersaturated concentrate from the evaporator, prior to being fed to crystallizers, is cooled to a temperature of about 75° C.

Two crystallizers are used and on introduction into the crystallizers the temperature is again reduced to about 50° C. In the crystallizers the concentrate is stirred constantly for about 12 hours at about 50° C. temperature; then it is cooled to about 20° C., and while still stirring it is kept in the crystallizers for another 12 hours before effecting separation of the crystals formed from their mother liquor.

A total of 80 lbs/hr filter cake is removed by filtration, the cake's profile being:

| wt % |     | lbs/hr |
|------|-----|--------|
| 25.0 | Fe  | 20.0   |
| 4.6  | Cr  | 3.7    |
| 0.8  | Ni  | 0.6    |
| 6.0  | $NO_3$ | 4.8  |
| 30.8 | F'  | 24.6   |
| 32.9 | $H_2O$ | 26.3 |

The filter cake is neutralized with lime which is admixed therewith at the rate of 38.4 lbs/hr. The neutralized product collected at the rate of 90.4 lbs/hr has this profile:

| wt % |     | lbs/hr |
|------|-----|--------|
| 31.6 | $Fe_2O_3$ | 28.6 |
| 6.0  | $Cr_2O_3$ | 5.4  |
| 0.9  | NiO | 0.8    |
| 7.0  | $Ca(NO_3)_2$ | 6.3 |
| 54.5 | $CaF_2$ | 49.3 |

The mother liquor (filtrate) is separated by filtration at the rate of 32.7 gals/hr (327 lbs/hr) has this profile:

| wt % |     | lbs/hr |
|------|-----|--------|
| 2.0  | Fe  | 6.5    |
| 1.5  | Cr  | 4.9    |
| 3.5  | Ni  | 11.9   |
| 26.0 | $NO_3$ | 85.1 |
| 5.1  | F'  | 16.6   |
| 61.7 | $H_2O$ | 202.0 |

This filtrate is combined with the distillate aforementioned from the heat exchanger (condenser) and, at the rate of 73 gals/hr (700 lbs/hr) fed to the pickling zone. The combined filtrate/distillate condensate profile follows:

| wt % |     | lbs/hr |
|------|-----|--------|
| 0.9  | Fe  | 6.5    |
| 0.7  | Cr  | 4.9    |
| 1.7  | Ni  | 11.9   |
| 12.7 | $NO_3$ | 88.8 |

-continued

| wt % | | lbs/hr |
|---|---|---|
| 3.2 | F' | 22.2 |
| 80.8 | H₂O | 565.7 |

Of course, additional HNO₃/HF/H₂O, at the following rates are added to the filtrate/distillate to form the pickling solution:

| lbs/hr | |
|---|---|
| 43 | HNO₃ |
| 32.2 | HF |
| 261.1 | H₂O |

Pursuant to statutory requirements, there are described above the invention and what are now considered its best embodiments. It should be understood, however, that the invention can be practiced otherwise than as specifically described, within the scope of the appended claims.

What is claimed is:

1. In the process of pickling metals with mixed aqueous solutions containing hydrofluoric acid and nitric acid by contacting the metals with the solutions in a pickling zone and recovering components of resultant spent pickling solutions, said spent solutions containing metal dissolved during pickling, including iron, the improvement which comprises:
   (i) rapidly evaporating the spent solution at boiling temperature in an evaporation zone to form a supersaturated concentrate containing 60 to 150 g/l Fe;
   (ii) within less than 60 minutes from the commencement of evaporation and upon achieving the 60 to 150 g/l Fe desideratum, cooling the concentrate a first time to a temperature in the range of about 50° C. to about 100° C. and transferring it to a crystallization zone;
   then cooling the concentrate a second time, in the crystallization zone, to a temperature in the range of about 30° C. to about 70° C., and maintaining, while stirring, this temperature for a period of 3 to 15 hours to effect crystallization;
   (iv) lowering the temperature of the concentrate a third time, in the crystallization zone, below the cooling temperature of the second cooling and to a range of about 15° C. to about 30° C. and maintaining, while stirring, this temperature for a period of 3 to 15 hours to effect further crystallization; and
   (v) separating the resulting crystals from resultant concentrate mother liquor, which mother liquor is suitable for additional pickling purposes.

2. The process of claim 1 in which, if necessary, additional aqueous hydrofluoric acid is added to the supersaturated concentrate before crystallization begins, the amount added being sufficient to maintain the fluoride ion normality of the concentrate above the sum of the metal ion normalities.

3. The process of claim 1 wherein the separation in step (v) is carried out by filtration.

4. The process of claim 1 in which evaporation of the spent pickling solution is achieved by heat supplied by direct electrode electrical resistance heating with alternating current, the current density at the solution-heating electrode interface being not in excess of $3.5 \log f - 5.5$ amperes per square centimeter where $f$ is the frequency of the alternating current in $\sec^{-1}$.

5. The process of claim 1 wherein hydrofluoric acid is added to any desired point to maintain the fluoride ion normality of the spent pickling solution always in excess of the sum of the metal ion normalities.

6. The process of claim 5 wherein the excess is about 10 to 50 g/l hydrofluoric acid.

7. The process of claim 1 wherein make-up nitric acid for compensating consumption of nitric acid is added to the mother liquor after step (v).

8. The process of claim 1 wherein the moist crystals which have been separated are washed with a small amount of water and at least nickel is recovered from the washing water, the crystals washed with water are heated to 200° to 600° C. to release hydrogen fluoride gas which is absorbed in an aqueous solution, said aqueous solution then being, optionally, used to provide circulating additional hydrofluoric acid solution.

9. The process of claim 1 wherein an essentially aqueous distillate, a first cut from the evaporation zone, is used as rinse water in the pickling zone.

10. The process of claim 1 wherein acidic distillate from the evaporation zone is used in the pickling zone.

11. The process of claim 1 wherein the crystallization zone is made of two or more successive zones and the concentrate flowing therethrough is maintained at the indicated temperatures in the first zone or zones and at the lower temperature in the subsequent zone or zones, the concentrate flow through these zones being at a rate which provides uniform residence times in the separate temperature zones.

12. The process of claim 1 wherein spent pickling solution is made to flow through an evaporating zone which is compartmentalized to collect distillate fractions having different component profiles.

13. The process according to claim 1 in which the evaporation rate in step (i) is controlled to maintain a constant overflow level of the concentrated solution.

14. In the process of pickling metals with mixed aqueous acid solutions containing hydrofluoric acid and nitric acid by contacting the metals with the solutions and recovering components of resultant spent pickling solutions, said spent solutions containing metal dissolved during pickling, including iron, the improvement which comprises:
   (i) rapidly evaporating the spent solution at boiling temperature to form a supersaturated concentrate containing 80 to 120 g/l Fe;
   (ii) within less than 15 minutes from the commencement of evaporation and upon achieving the 80 to 120 g/l Fe desideratum, cooling the concentrate a first time to a temperature in the range of about 70° C. to about 78° C. and transferring it to a crystallization zone;
   (iii) then cooling the concentrate a second time, in the crystallization zone, to a temperature in the range of about 40° C. to about 60° C., and maintaining, while stirring, this temperature for a period of 4 to 12 hours to effect crystallization;
   (iv) lowering the temperature of the concentrate a third time, in the crystallization zone, below the temperature of the second cooling and to a range of about 18° C. to about 25° C. and maintaining, while stirring, this temperature for a period of 4 to 12 hours to effect further crystallization; and
   (v) separating the resulting crystals from resultant concentrate mother liquor, which mother liquor is suitable for additional pickling purposes.

* * * * *